United States Patent
Geil et al.

(10) Patent No.: US 10,931,705 B2
(45) Date of Patent: *Feb. 23, 2021

(54) CORRELATED RISK IN CYBERSECURITY

(71) Applicant: BitSight Technologies, Inc., Boston, MA (US)

(72) Inventors: Ethan Geil, Concord, MA (US); Marc Light, Somerville, MA (US)

(73) Assignee: BitSight Technologies, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/795,056

(22) Filed: Feb. 19, 2020

(65) Prior Publication Data

US 2020/0195681 A1 Jun. 18, 2020

Related U.S. Application Data

(63) Continuation of application No. 16/292,956, filed on Mar. 5, 2019, now Pat. No. 10,594,723, which is a (Continued)

(51) Int. Cl.
*H04L 29/06* (2006.01)
*G06F 21/57* (2013.01)
(Continued)

(52) U.S. Cl.
CPC .... *H04L 63/1433* (2013.01); *G06F 16/24578* (2019.01); *G06F 16/288* (2019.01);
(Continued)

(58) Field of Classification Search
CPC ............ G06F 16/24578; G06F 16/288; G06F 16/9024; G06F 17/18; G06F 21/577; G06F 2221/034; H04L 63/1408; H04L 63/1433
See application file for complete search history.

(56) References Cited

U.S. PATENT DOCUMENTS 9,401,926 B1 * 7/2016 Dubow .............. H04L 63/1408
9,680,855 B2 * 6/2017 Schultz .............. G06Q 10/0635
(Continued)

OTHER PUBLICATIONS

Search Query Report from IP.com (performed Apr. 27, 2020).*
Search Query Report from IP.com (performed Oct. 18, 2020) (Year: 2020).*

*Primary Examiner* — Sharon S Lynch
(74) *Attorney, Agent, or Firm* — Goodwin Procter LLP (57) ABSTRACT

Computer-implemented methods are provided herein for quantifying correlated risk in a network of a plurality of assets having at least one dependency, where each asset belongs to at least one entity. The method includes generating a dependency graph based on relationships between the assets, at least one dependency, and at least one entity, and executing a plurality of Monte Carlo simulations over the dependency graph. Executing a plurality of Monte Carlo simulations includes generating a seed event in the dependency graph, where the seed event has a probability distribution, and propagating disruption through the dependency graph based on the seed event. The method further includes assessing loss for each of the assets, and aggregating losses for two or more assets to determine correlated risk in the network.

20 Claims, 5 Drawing Sheets

Related U.S. Application Data continuation of application No. 15/918,286, filed on Mar. 12, 2018, now Pat. No. 10,257,219.

(51) Int. Cl.

| | | |
|---|---|---|
| *G06F 16/28* | (2019.01) | |
| *G06F 16/901* | (2019.01) | |
| *G06F 16/2457* | (2019.01) | |
| *G06F 17/18* | (2006.01) | |

(52) U.S. Cl.
CPC ........ G06F 16/9024 (2019.01); G06F 21/577 (2013.01); H04L 63/1408 (2013.01); *G06F 17/18* (2013.01); *G06F 2221/034* (2013.01)

(56) References Cited

U.S. PATENT DOCUMENTS

| | | | | |
|---|---|---|---|---|
| 10,257,219 | B1* | 4/2019 | Geil | G06F 16/24578 |
| 2003/0187967 | A1* | 10/2003 | Walsh | H04L 41/147 |
| | | | | 709/223 |
| 2005/0066195 | A1* | 3/2005 | Jones | G06Q 10/10 |
| | | | | 726/4 |
| 2007/0067845 | A1* | 3/2007 | Wiemer | H04L 63/1433 |
| | | | | 726/25 |
| 2008/0222287 | A1* | 9/2008 | Bahl | H04L 41/12 |
| | | | | 709/224 |
| 2011/0145168 | A1* | 6/2011 | Dirnstorfer | G06Q 40/06 |
| | | | | 705/36 R |
| 2011/0225085 | A1* | 9/2011 | Takeshita | G06Q 40/02 |
| | | | | 705/38 |
| 2012/0221376 | A1* | 8/2012 | Austin | G06Q 40/06 |
| | | | | 705/7.28 |
| 2013/0091574 | A1* | 4/2013 | Howes | G06Q 10/10 |
| | | | | 726/24 |
| 2013/0347116 | A1* | 12/2013 | Flores | H04L 63/1433 |
| | | | | 726/25 |
| 2015/0381649 | A1* | 12/2015 | Schultz | H04L 63/1433 |
| | | | | 726/25 |
| 2016/0119373 | A1* | 4/2016 | Fausto | H04L 63/1433 |
| | | | | 726/25 |
| 2017/0279843 | A1* | 9/2017 | Schultz | H04L 63/14 |
| 2017/0300911 | A1* | 10/2017 | Alnajem | G06Q 20/4014 |
| 2017/0324766 | A1* | 11/2017 | Gonzalez Granadillo | |
| | | | | H04L 63/20 |
| 2018/0322584 | A1* | 11/2018 | Crabtree | G06N 20/00 |
| 2019/0297106 | A1* | 9/2019 | Geil | H04L 63/1408 |

\* cited by examiner

CORRELATED RISK IN CYBERSECURITY

CROSS-REFERENCE TO RELATED APPLICATIONS

This application is a continuation of and claims priority to U.S. patent application Ser. No. 16/292,956, titled "Correlated Risk in Cybersecurity" and filed on Mar. 5, 2019, which is a continuation of and claims priority to U.S. patent application Ser. No. 15/918,286, titled "Correlated Risk in Cybersecurity" and filed on Mar. 12, 2018, which are hereby incorporated by reference herein in their entireties.

TECHNICAL FIELD

The following disclosure is directed to methods and systems for quantifying correlated risk in networks and, more specifically, methods and systems for quantifying correlated risk in networks due to cybersecurity incidents.

BACKGROUND

Network-based software and services (including websites, electronic communications, software-as-a-service (SaaS) offerings, and others) rely on an increasingly large and complex set of dependencies to operate. A failure or breach of any of these dependencies can cause service disruptions, outages, and other negative outcomes for the services that depend on them (directly or indirectly), resulting in loss of business continuity or other financial harm to the organizations that operate them.

There are many possible kinds of dependencies. One major category is service providers. These include (but are not limited to) hosting providers, domain name systems (DNS), content delivery networks (CDN), cloud infrastructure, managed Web servers, email services, payment processors, certificate authorities, and analytics and monitoring.

A second category includes components used to build and operate products and services. These include (but are not limited to) operating systems, application servers, code libraries, databases, networking systems, and hardware. A systematic fault in one of these components can simultaneously affect large numbers of services that use the component. For example, a bug in the Linux kernel related to leap seconds caused widespread disruption in 2012.

A third—and less obvious—category consists of software defects and malicious software. Although these are not intentional dependencies, they, too, can pose significant aggregate risk. For example, a wide-scale ransomware attack has the potential to disrupt large numbers of software services and businesses.

Dependency relationships are often not immediately apparent. For example, if Web site A is hosted on hosting provider B, and hosting provider B uses a domain-name service (DNS) provider C, a failure of C can lead to a failure of A, even though no direct business or technical relationship—only a transitive one—exists between A and C.

Furthermore, large numbers of services (and businesses) may rely on a single dependency (direct or transitive). A failure of that dependency can thus cause surprisingly widespread disruptions. These dependencies therefore create aggregate risk (also known as correlated risk) from the point of view of a business operating multiple services or service instances, or from the point of view of an organization with a financial interest in a portfolio of businesses (e.g., insurance or investments).

Many methods of reliability and risk analysis assume that failures are uncorrelated and independent, because this greatly simplifies the analysis. However, because of the above points, this assumption often leads to inaccuracies and/or understated risks in networked environments. There is a current need for methods of identifying dependencies and other risk factors which pose high levels of aggregate risk, and of quantifying this risk.

SUMMARY

Methods and systems are described herein to identify such dependencies that may be the sources of risk and accurately quantify that risk. The methods include capturing the relationships among entities (such as organizations or companies), their assets, and the dependencies that pose risks to the operation of those assets. These relationships can be identified via a dependency graph. The dependency graph may also include portfolio level nodes to aid risk managers in identifying risk in a collection across multiple entities—even if those entities are not directly related. Note that the assets may be weighted by their importance to their owners, based on traffic data and other metrics. Risk is evaluated and quantified by carrying out repeated sampling and probabilistic simulations (e.g., Monte Carlo trials) over the dependency graph. In each simulation, a seed event is generated representing a disruption caused by the failure of a dependency (or the occurrence of a botnet attack, software defect, or other systemic effect). Next, the disruption caused by the seed event is propagated probabilistically though the graph. Once propagation is complete, the loss is assessed for each asset, and the aggregate losses are accumulated at the entity and portfolio levels. Statistics are gathered from the collection of individual runs.

In accordance with an embodiment of the disclosure, a computer-implemented method is provided for quantifying correlated risk in a network of assets having one or more dependencies, where each asset belongs to at least one entity. The method includes generating a dependency graph based on relationships between the assets, at least one dependency, and at least one entity, and executing Monte Carlo simulations over the dependency graph, including generating a seed event in the dependency graph, where the seed event has a probability distribution, and propagating a disruption through the dependency graph based on the seed event. An estimated loss is assessed for each of the assets, which may be aggregated across multiple assets to determine correlated risk in the network.

In a related embodiment, the assets are selected from a group consisting of: Internet Protocol (IP) address, domain name, and server system; and each entity may be a company or an organization. The dependencies may result from using a hosting provider and/or a software version. Optionally, the method includes receiving information indicative of the relationships between the plurality of assets, at least one dependency, and at least one entity.

In another related embodiment, the method includes storing information indicative of the relationships among the assets, the dependencies, and at the entities in a database, wherein the information is at least one of the group consisting of: domain name system (DNS) record, server banner, traffic data, malware infection, and software version. Optionally, the method includes observing traffic to and from a particular asset in the network to identify at least one of (i) an entity and (ii) a dependency related to the particular asset.

In a further related embodiment, each of the assets may be weighted according to its importance to an entity owning, controlling or using the asset. Optionally, the dependency graph includes (i) edges representing relationships among the assets, at least one dependency, and at least one entity and (ii) nodes representing the assets, at least one dependency, and at least one entity, wherein each edge has a conditional probability that the asset on a receiving node of a particular edge is compromised given that the providing node is compromised.

In yet another related embodiment, propagating disruption through the dependency graph may continue through the dependency graph until a threshold number of nodes is affected, such as a threshold amount of loss aggregated among assets. Optionally or alternatively, the seed event may be a breach or failure of the at least one dependency. In a related embodiment, the probability distribution is a probability that the asset will become unavailable if the dependency fails. In a further related embodiment, the method may include storing information related to the aggregated losses in a database.

In another related embodiment, the entity includes at least two entities, and a first asset belongs to a first entity and a second asset belongs to a second entity. In a related embodiment, at least one of the assets belongs to another entity of the entities. Optionally, the method includes aggregating losses for two or more entities to determine correlated risk in the network. In a related embodiment, the method includes storing information related to the aggregated losses for the two or more entities in a database. Optionally, each of the at least two entities is assigned to at least one portfolio, and wherein the method further includes aggregating losses for two or more portfolios to determine correlated risk in the network. Optionally or alternatively, the method includes storing information related to the aggregated losses for the two or more portfolios in a database.

In a related embodiment, the aggregating losses for two or more assets to determine correlated risk in the network further includes aggregating losses in a nonlinear sum for the two or more assets. In another related embodiment, a number of the plurality of Monte Carlo simulations is selected to reduce a statistical variance of the plurality of Monte Carlo simulations. Optionally, the execution of Monte Carlo simulations over the dependency graph further includes determining if a statistical variance is equal to or less than a threshold, and terminating the Monte Carlo simulations if the statistical variance is equal to or less than the threshold.

DETAILED DESCRIPTION

Described herein are methods and systems that enable the identification and quantification of aggregate risk posed to entities and portfolios of entities by dependencies and other risk factors. In the following, FIGS. 1-4 are described together for clarity purposes.

Identifying Relationships

Figure 1A:
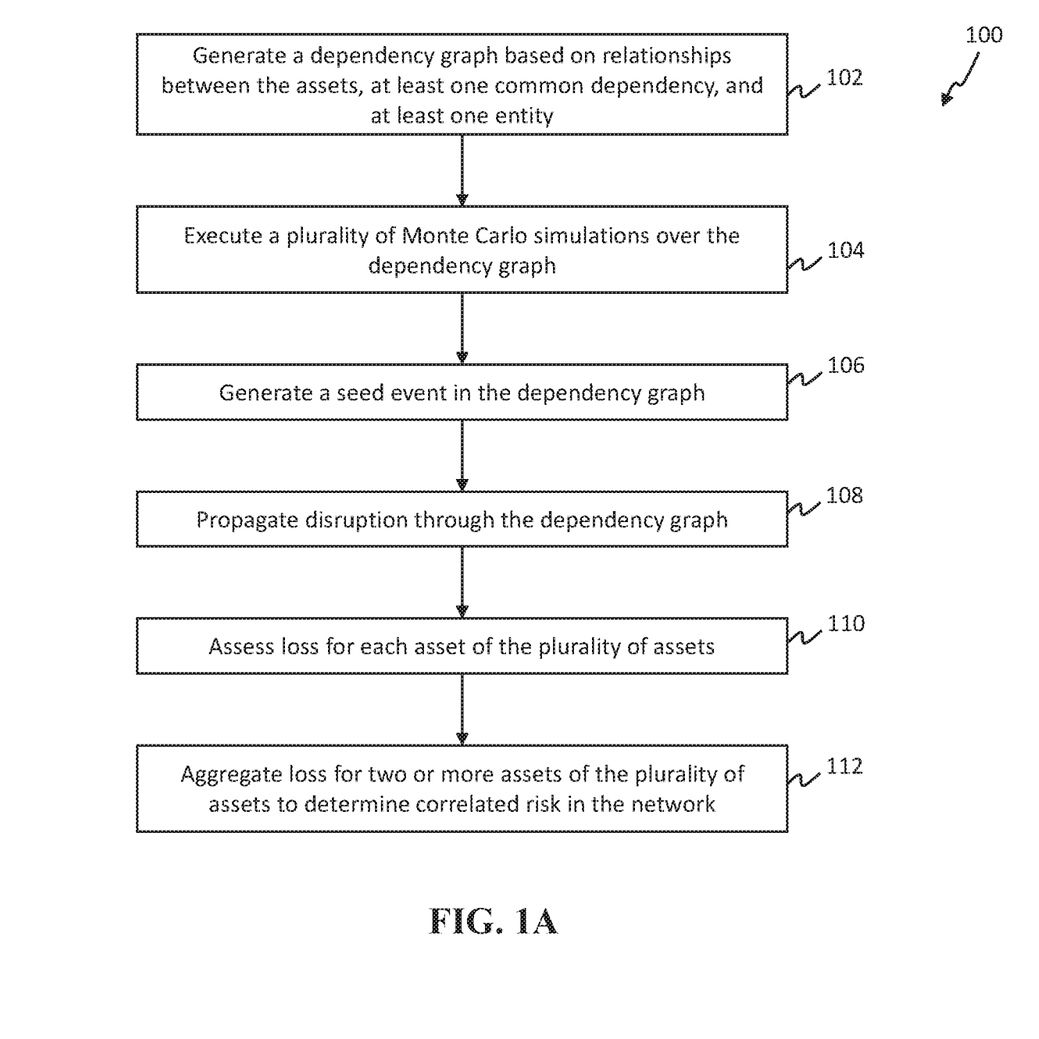
FIGS. 1A-1B are flowcharts of exemplary computer-implemented methods for quantifying correlated risk in a network.
Figure 1B:
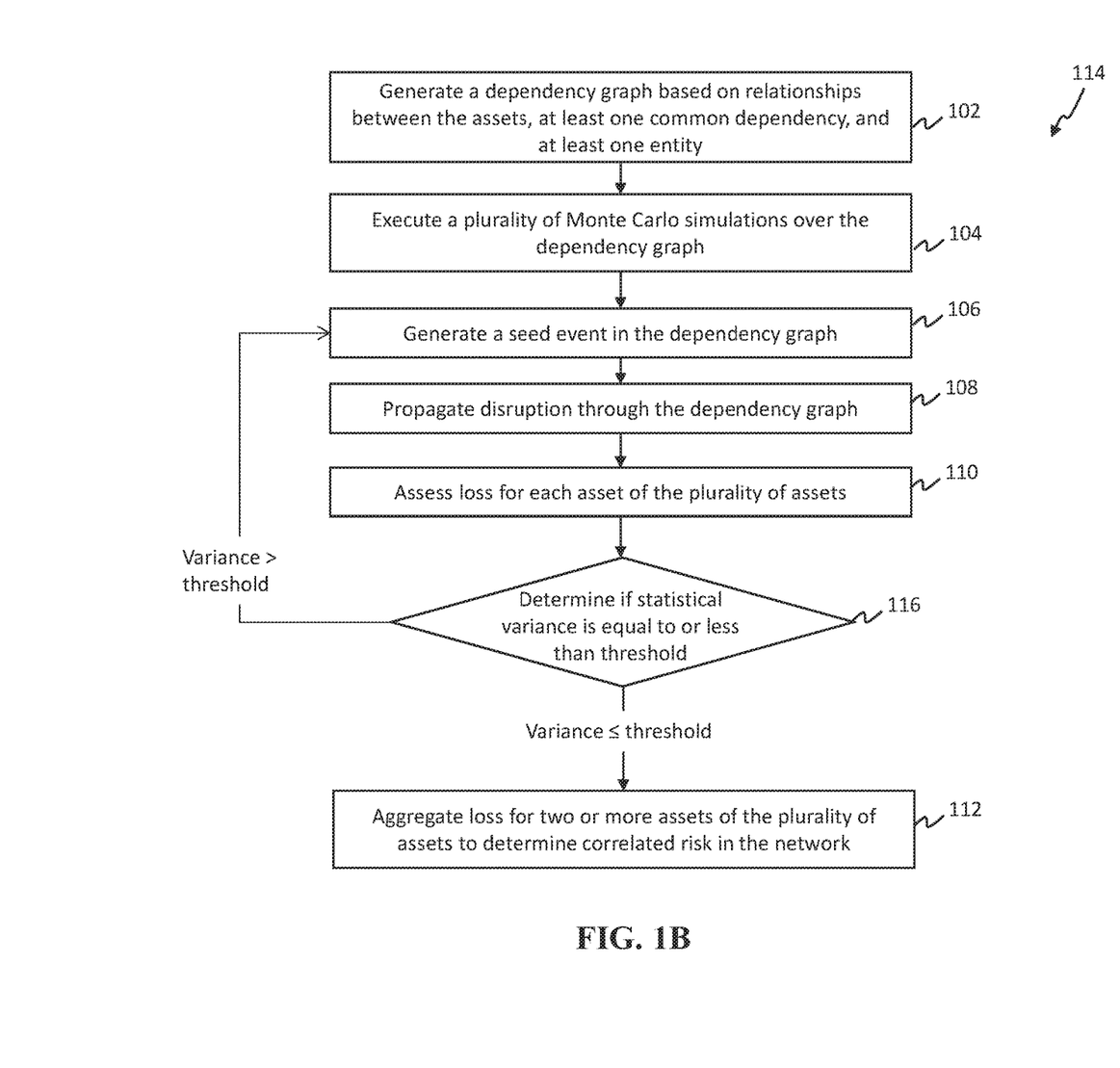

FIG. 1A is a flowchart of an exemplary computer-implemented method 100 for quantifying correlated risk in a network. An exemplary network includes a plurality of assets, at least one dependency, and at least one entity. In process 102, a processor (such as processor 408, 410, and/or 412 illustrated in FIG. 4) can generate a dependency graph based on relationships among the plurality of assets, the at least one dependency, and the at least one entity, as detailed below. Optionally, the dependency graph can include at least one portfolio containing the at least one entity, as detailed below. In other embodiments, the processor stores or defines information related to the relationships among the different constituents (assets, dependency or dependencies, entity or entities, portfolio(s)) in a table, relational database, or flat file instead of a graph.

Figure 2:
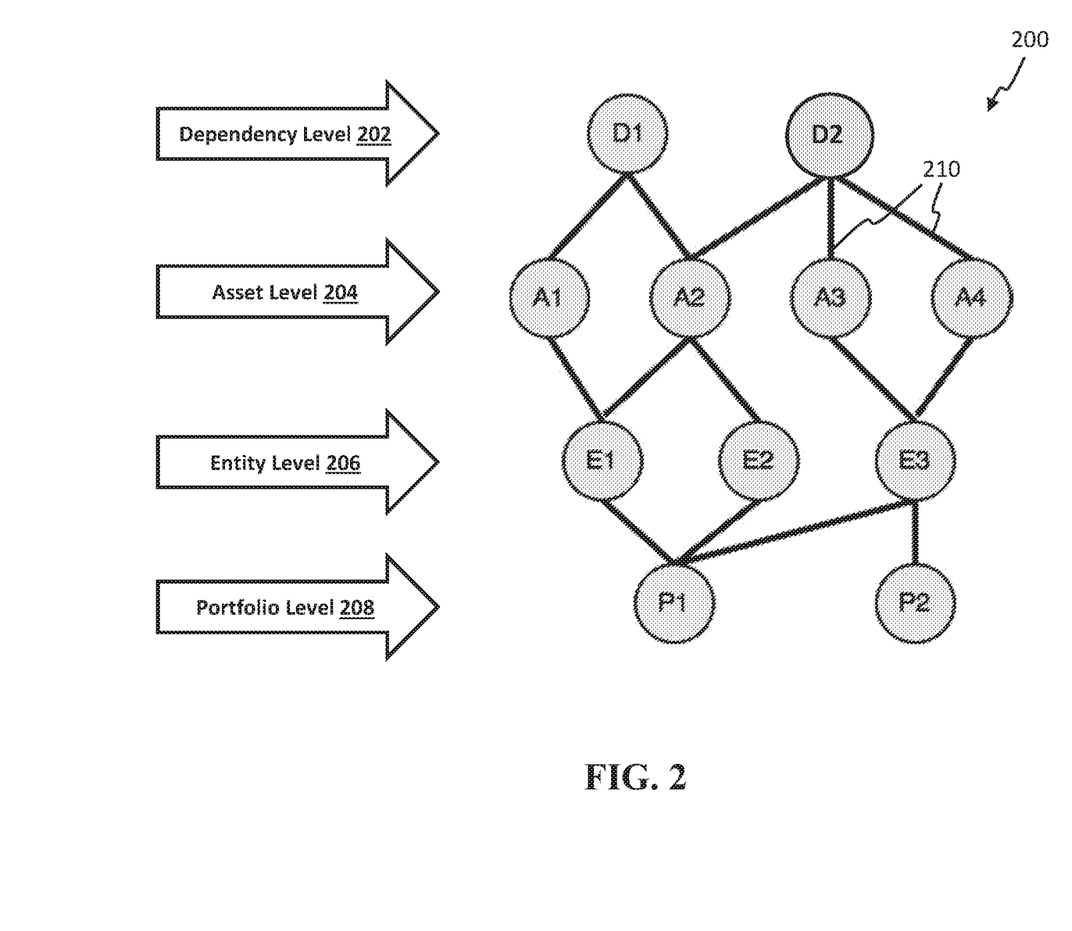
FIG. 2 is a schematic diagram of an exemplary network of plurality of assets, at least one dependency, at least one entity, and at least one portfolio.

FIG. 2 is a schematic diagram of an exemplary dependency graph 200 of plurality of assets (A(n+1)), at least one dependency (Dn), at least one entity (En), and at least one portfolio (Pn), wherein n is any natural number {1, 2, 3, . . . }. Dependency level 202 includes at least one dependency D1, D2 (e.g., hosting providers or software version). Asset level 204 includes the plurality of assets A1-A4 (e.g., domain names, servers, Internet Protocol (IP) addresses, hosts, etc.) belonging to one or more entities E1-E3. The edges 210 between the dependency and asset levels 202, 204 indicate a dependency relationship involving the asset and the dependency. For example, A1 and A2 are dependent on same dependency D1 while A2 is also dependent on D2. Thus, each asset An may have one or more dependency Dn. The assets are each weighted by their importance to their owners (entities), based on traffic data and other metrics. Importance may be assessed in terms of financial impact (e.g. percentage of revenue), fraction of network traffic, or custom metrics defined by the user. Entity level 206 includes entities E1, E2, E3 (companies or organizations), which are linked to their assets. For example, entity E1 is linked to both assets A1 and A2 while E1 is linked to asset A2. Portfolio level 208 includes at least one portfolio. Each portfolio Pn may include one or more entities En. The relationships between the constituents represent links critical to the operation of, for instance, the assets.

Various constituents of the network can be identified in one of several ways, which include observations of network traffic and published records. For more detail on the identification of assets and their relationships to entities, refer to commonly owned U.S. Publication No. 2017/0236077, published on Aug. 17, 2017 and titled "Relationships among technology assets and services and the entities responsible for them" the entire disclosure of which is included herein by reference. The data that are used to generate the graph 200 are collected via multiple processes, including (but not limited to) network maps, observations of network traffic, domain name system (DNS) records, server responses, malware infections, and/or published information. In some embodiments, inter-business payment data (e.g., data provided by Dun & Bradstreet, Inc., New Jersey) to discover business relationships, and therefore dependencies.

In some embodiments, network observations can be collected and stored in a database coupled to the processor. For more detail, refer to commonly owned U.S. Pat. No. 9,705,932, issued on Jul. 11, 2017 and titled "Methods and systems for creating, de-duplicating, and accessing data using an object storage system" the entire disclosure of which is included herein by reference. These network observations include DNS records (to identify DNS providers, email providers, and other relationships), server banners (to identify software and operating system dependencies and risk factors), references to resources used (e.g. JavaScript libraries), traffic data, malware (e.g. botnet) infections, software versions used within an organization, and/or records of insecure systems. In some examples, observations can be assigned to entities via their network maps. A network map can include Internet Protocol (IP, Version 4 or Version 6) address ranges, autonomous system (AS) numbers, domain names, and hostnames owned by a particular entity. Each of these entries can be associated with a date range for which it is effective. The data can be partitioned and ordered by timestamp to facilitate efficiency of processing. Some or all of these data may also be used in the hazard model that is used to determine the probability of seed events, as discussed in more detail below. For example, a service provider with a poor security posture suffers a greater average rate of disruptions and failures due to cybercrime attacks. In some examples, some or all of these data also may be used to assess the relative importance or criticality of assets. For example, those with higher volumes network traffic may have greater value, and may generate larger losses when compromised.

Disruption Simulation

Referring back to FIG. 1A, in process 104, the processor executes a plurality of Monte Carlo simulations over the dependency graph 200. To do so, the processor generates a 'seed event' according to a hazard model. A hazard model is a probability distribution over possible events (e.g. an outage of a particular network component). This probability distribution can be derived from empirical observations, from theoretical models, or from some combination of empirical observations and theoretical models. A seed event can be a failure or disruption (such as an occurrence of a botnet attack, software defect, or other systematic effect) at one or more of the constituents (assets, dependency or dependencies, entity or entities, portfolio(s)). In some examples, the seed event is generated at the dependency level 202. The seed events are drawn from a probability distribution that may be based on empirical observations of similar events (e.g., the incidence of malware infections or DNS attacks), from theoretical models, or from other models derived from empirical data. In some examples, the seed events may optionally be chosen by an end user of the system to investigate a particular scenario.

In process 106, disruptions are propagated probabilistically through the graph 200, using the conditional probability distributions on each edge 210. For example, an edge 210 may have the probability that a given asset will become unavailable, given that the dependency in question failed. The probability may be defined as the probability that the asset on the receiving end of the edge is compromised (or affected in some other specified way), given that the node on the provider end of the edge is compromised. The conditional probabilities may be determined by empirical observations of actual events, by theoretical models, or some combination of the two. In some examples, the propagation proceeds for either a fixed number of steps or until a threshold for the affected number of nodes, the magnitude of the loss, or other criterion is reached. This propagation technique can take complex dependency relationships, including transitive and circular dependent relationships, into account.

Assessing and Aggregating Loss(es)

Referring back to FIG. 1A, in process 110, potential losses assessed for some or all of the plurality of assets. In process 112, the losses are then aggregated for each asset An. In some embodiments, losses at the assets An are aggregated at the portfolio level 208, at the entity level 206, or both. In some embodiments, the losses can be aggregated per portfolio Pn or per entity En. The dependency nodes Dn, which are the sources of risk, propagate risk to assets An that rely on the dependencies. In some embodiments, other nodes, such as assets, can be made into sources of risk by creating additional dependency nodes. In some embodiments, the aggregated losses may be simple sums, or they may involve more complex loss models including thresholds, limits, and other conditions. For example, certain policies may limit losses to a certain level or certain constituent (such as per entity or per asset).

Each simulation produces an output of projected loss data. Multiple simulations are run and the outputs from the runs are stored in a database. Having repeated the simulations a plurality of times, statistics can be gathered or derived from the simulation results. These statistics can include mean expected loss or loss exceedance curves. Referring to the method 114 of FIG. 1B, in some embodiments, once the losses are assessed in process 110, the processor can determine if the statistical variance is equal to or less than a threshold in process 116. If so, the losses are aggregated in process 112. Otherwise, control returns to process 106 for one or more runs of the Monte Carlo simulation. Note that, in some embodiments, process 116 can occur after process 112 in that the variance can be measured after aggregation. In this embodiment, the post-aggregation measured variance can be optionally used as a convergence criterion. Thus, if the statistics have not converged, an additional number of simulations are executed until they do converge. The process terminates when the variance of the desired statistics reaches an acceptable level (i.e. the statistics have converged). In some embodiments, the number of simulation iterations may be chosen a priori. In other embodiments, iterations may be continued until the variance of the statistics is reduced to the desired level. For instance, the expected variance for the financial loss can be limited to 1% of the square of the mean.

Figure 3:
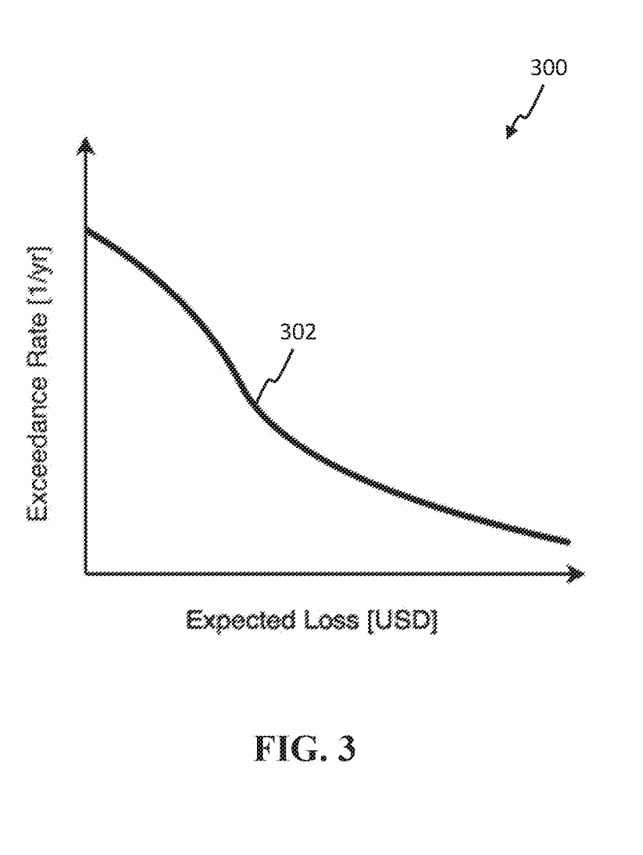
FIG. 3 is a graph of the loss exceedance curve as a function of loss in U.S. Dollars produced from the simulation results.

The simulation results can be used to identify dependencies that pose large aggregate risks, and to quantify the level of aggregate risk exposure for each portfolio or entity of interest. These results, and the statistics derived therefrom, are used to generate charts, tables, and/or metrics that can be used by a risk manager to assess and quantify risk(s) associated with entities and/or portfolios. FIG. 3 is a graph 300 of the loss exceedance curve 302 as a function of loss in U.S. Dollars produced from the simulation results. The relationship between loss and the exceedance rate (expressed in 1/year) is indirectly proportional and generally non-linear. The loss exceedance curve 302 enables a risk analyst to determine, for example, whether the rate of losses exceeding a threshold (such as a predetermined quantity of $1 million) falls within acceptable bounds of the exceedance rate (such as an incidence of once per 100 years).

In some embodiments, the results are stored in a manner that allows losses at the portfolio level to be determined dynamically (for portfolios that were not yet defined when the simulations were run), without having to repeat the computationally expensive simulation steps. This enables a user interacting with a user interface of the system to quickly evaluate how changes in portfolio composition or dependencies affect the aggregate risk. In some embodiments, the simulation results can be used to produce visualizations, tables, and other displays that may be used to interactively identify sources of aggregate risk, and to evaluate the level of aggregate risk posed by dependencies, at the portfolio and individual entity level.

System(s) for Quantifying Correlated Risk

Figure 4:
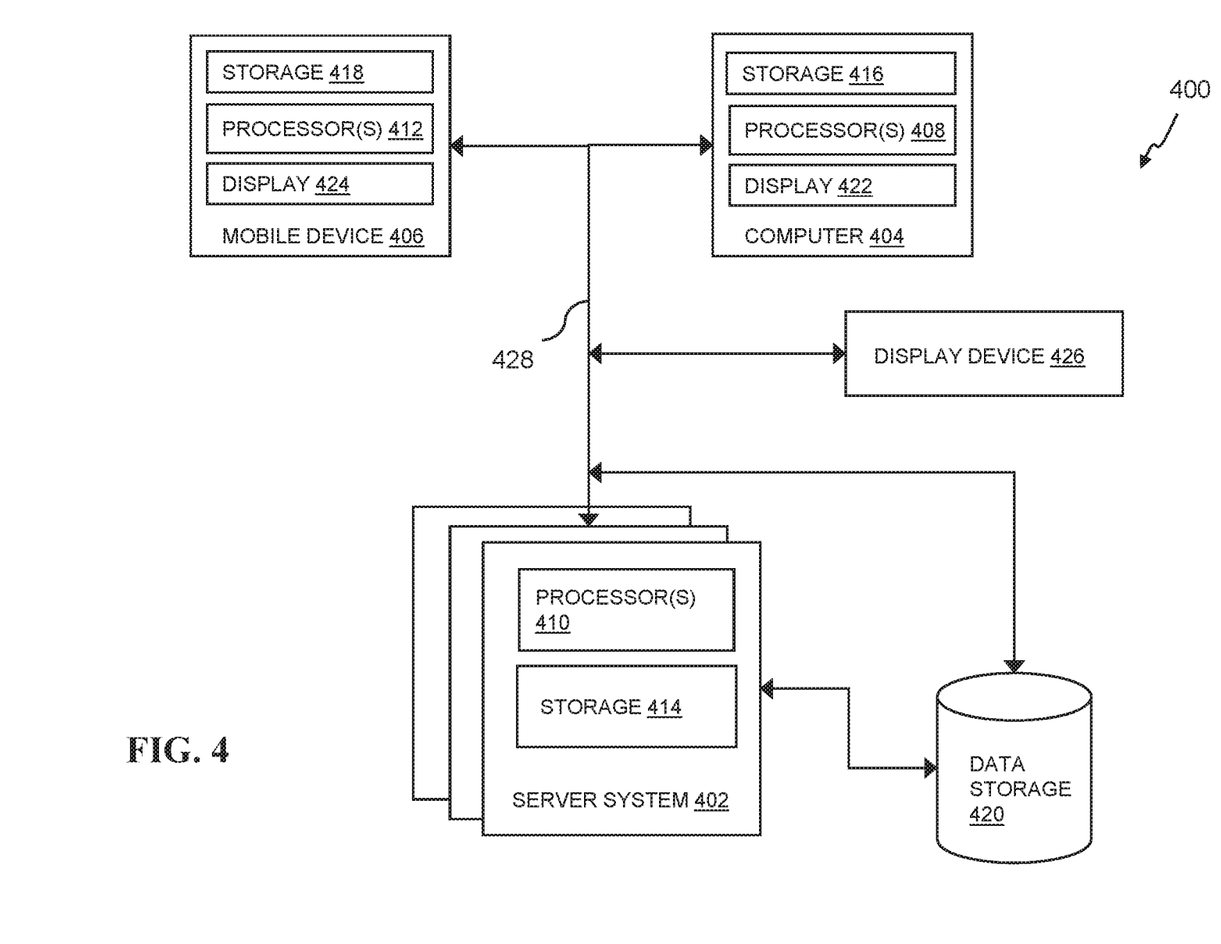
FIG. 4 is a diagram of an exemplary system 400 configured to quantify correlated risk in network of assets, one or more dependencies, one or more entities, and/or one or more portfolio.

FIG. 4 is a diagram of an exemplary system 400 configured to quantify correlated risk in network of assets, one or more dependencies, one or more entities, and/or one or more portfolio. The one or more processes of methods described herein (see FIGS. 1A-1B) may be executed by a processor of a server system 402, a computer 404, and/or a mobile device 406. In some examples, a processor 408 of computer 404 can execute a first subset of the processes (such as process 102 of FIGS. 1A-1B) while relying on a processor 410 of server system 402 to execute a second subset of the processes (such as processes 104-108 of FIGS. 1A-1B). In some embodiments, the first and second subsets of processes may overlap. Server 402, computer 404, and mobile device 406 may each have their own storage (414, 416, and 418, respectively) or be coupled to an external data storage system 420. Computer 404 and mobile device 406 may each have their own display (422 and 424, respectively) or be coupled to an external display device 426.

The term "system" 400 may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media, and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of the server system 402) is a general-purpose computer, and sometimes it is a custom-tailored special purpose electronic device, and sometimes it is a combination of these things.

Implementations can include a back-end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network.

Server 402, computer 404, mobile device 406, display device 426, and data storage server 420 may communicate with each other (as well as other devices and data sources) via a network 428. Network communication may take place via any media such as standard and/or cellular telephone lines, LAN or WAN links (e.g., T1, T3, 56 kb, X.25), broadband connections (ISDN, Frame Relay, ATM), wireless links, and so on. Preferably, the network 125 can carry TCP/IP protocol communications, and HTTP/HTTPS requests made by the mobile device and the connection between the mobile device 406 and the server 402 can be communicated over such networks. In some implementations, the network includes various cellular data networks such as 2G, 3G, 4G, and others. The type of network is not limited, however, and any suitable network may be used. Typical examples of networks that can serve as the communications network 428 include a wireless or wired Ethernet-based intranet, a local or wide-area network (LAN or WAN), and/or the global communications network known as the Internet, which may accommodate many different communications media and protocols.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

The terms and expressions employed herein are used as terms and expressions of description and not of limitation and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The structural features and functions of the various embodiments may be arranged in various combinations and permutations, and all are considered to be within the scope of the disclosed invention. Unless otherwise necessitated, recited steps in the various methods may be performed in any order and certain steps may be performed substantially simultaneously. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method for quantifying correlated risk in a network comprising a plurality of assets, at least one dependency, and at least one entity, the method comprising:
generating a dependency graph based on relationships among the plurality of assets, the at least one dependency, and the at least one entity, wherein at least two of the assets are related to the at least one dependency and wherein the entity is related to at least one of the assets;
executing a plurality of Monte Carlo simulations over the dependency graph by:
generating a seed event in the dependency graph, the seed event having a probability distribution, wherein the probability distribution represents a likelihood that an asset will become unavailable when a related dependency fails; and
propagating disruption through the dependency graph based on the seed event until a threshold number of affected assets is reached;
assessing loss for a subset of the plurality of assets; and
aggregating losses for two or more assets of the subset of assets to determine a correlated risk across the network.

2. The method of claim 1, wherein:
each of the plurality of assets is selected from the group consisting of: Internet Protocol (IP) address, domain name, and server system;
each of the at least one entity is selected from the group consisting of: a company and an organization; and
each of the at least one dependency is selected from the group consisting of: hosting provider and software version.

3. The method of claim 1, further comprising:
receiving information indicative of the relationships between the plurality of assets, the at least one dependency, and the at least one entity.

4. The method of claim 3, further comprising:
storing information indicative of the relationships between the plurality of assets, the at least one dependency, and the at least one entity in a database, wherein the information is at least one of the group consisting of: domain name system (DNS) record, server banner, traffic data, malware infection, and software version.

5. The method of claim 3, further comprising:
observing traffic to and from a particular one of the plurality of assets in the network to identify at least one of (i) an entity and (ii) a dependency related to the particular asset.

6. The method of claim 3, wherein the information indicative of the relationships includes inter-business payment data.

7. The method of claim 1, wherein each of the plurality of assets is weighted according to an importance of each respective asset to the at least one entity having the asset.

8. The method of claim 1, wherein the dependency graph comprises (i) a plurality of edges representing relationships between the plurality of assets, the at least one dependency, and the at least one entity and (ii) a plurality of nodes representing the plurality of assets, the at least one dependency, and the at least one entity,
wherein each edge has a conditional probability that the asset on a receiving node of a particular edge, of the plurality of edges, is compromised given that the providing node, of the plurality of nodes, is compromised.

9. The method of claim 8, wherein the propagating disruption through the dependency graph based on the seed event further comprises:
propagating disruption through the dependency graph until a threshold amount of loss is aggregated among the two or more assets.

10. The method of claim 1, wherein the seed event is a breach or failure of the at least one dependency.

11. The method of claim 1, further comprising:
storing information related to the aggregated losses for the two or more assets of the plurality of assets in a database.

12. The method of claim 1, wherein the at least one entity comprises at least two entities, and a first asset of the two or more assets belongs to a first entity of the at least two entities and a second assets of the two or more assets belongs to a second entity of the at least two entities.

13. The method of claim 12, wherein at least one of the first and second assets belongs to another entity of the at least two entities.

14. The method of claim 12, further comprising:
aggregating losses for two or more entities of the at least two entities to determine correlated risk in the network.

15. The method of claim 14, further comprising:
storing information related to the aggregated losses for the two or more entities of the at least two entities in a database.

16. The method of claim 12, wherein each of the at least two entities is assigned to at least one portfolio, and wherein the method further comprises:
aggregating losses for two or more portfolios of the at least one portfolio to determine correlated risk in the network.

17. The method of claim 16, further comprising:
storing information related to the aggregated losses for the two or more entities of the at least two entities in a database.

18. The method of claim 1, wherein the aggregating losses for two or more assets of the plurality of assets to determine correlated risk in the network level further comprises:
aggregating losses in a nonlinear sum for the two or more assets of the plurality of assets.

19. The method of claim 1, wherein a number of the plurality of Monte Carlo simulations is selected to reduce a statistical variance of the plurality of Monte Carlo simulations.

20. The method of claim 1, wherein the executing a plurality of Monte Carlo simulations over the dependency graph further comprises:
comparing a statistical variance to a threshold; and
terminating the plurality of Monte Carlo simulations when the statistical variance is equal to or less than the threshold.

* * * * *